US009366990B1

(12) United States Patent
Ciecior et al.

(10) Patent No.: US 9,366,990 B1
(45) Date of Patent: Jun. 14, 2016

(54) METHOD OF QUANTIFYING COVERAGE OF EXTRA PARTICULATE ADDITIVES ON THE SURFACE OF TONER PARTICLES

(71) Applicants: Gerald Hugh Ciecior, Westminster, CO (US); Vladimir Kantorovich, Boulder, CO (US); Brian David Munson, Mead, CO (US); Dat Quoc Nguyen, Platteville, CO (US); Cynthia Faye Reeves-Janzen, Longmont, CO (US); Peter Nikolaivich Yaron, Denver, CO (US)

(72) Inventors: Gerald Hugh Ciecior, Westminster, CO (US); Vladimir Kantorovich, Boulder, CO (US); Brian David Munson, Mead, CO (US); Dat Quoc Nguyen, Platteville, CO (US); Cynthia Faye Reeves-Janzen, Longmont, CO (US); Peter Nikolaivich Yaron, Denver, CO (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 16 days.

(21) Appl. No.: 14/565,492

(22) Filed: Dec. 10, 2014

(51) Int. Cl.
*G06K 9/00* (2006.01)
*G03G 15/08* (2006.01)

(52) U.S. Cl.
CPC .................................. *G03G 15/0824* (2013.01)

(58) Field of Classification Search
None
See application file for complete search history.

(56) References Cited

U.S. PATENT DOCUMENTS

2011/0229811 A1* 9/2011 Saito .................... G03G 9/0825 430/105
2013/0101931 A1* 4/2013 Hagiwara .............. B82Y 30/00 430/105

* cited by examiner

*Primary Examiner* — Mark Roz

(57) ABSTRACT

A method of quantifying the coverage of extra particulate additives (EPA) on the surface of toner particles is provided. More specifically, this invention is a method using automated image analysis to correctly identify toner and coverage of EPA particles on the surface of the toner.

17 Claims, 3 Drawing Sheets

METHOD OF QUANTIFYING COVERAGE OF EXTRA PARTICULATE ADDITIVES ON THE SURFACE OF TONER PARTICLES

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to a method of quantifying the coverage of extra particulate additives (EPA) on the surface of toner particles. More specifically, this invention is a method using automated image analysis to correctly identify toner and coverage of EPA particles on the surface of the toner.

2. Description of the Related Art

Toner may be utilized in image forming devices, such as printers, copiers and/or fax machines, to form images on a sheet of media. The image forming apparatus may transfer the toner from a reservoir to the media via a developer system utilizing differential charges generated between the toner particles and the various components in the developer system. Electrophotographic printing may be carried out using a monocomponent development (MCD) system that requires the use of a toner adder roll, developer roll, and doctor blade for charging and doctoring the toner, or a dual component development (DCD) system which requires the use of a magnetic carrier and a magnetic roll to help charge the toner. Using a DCD system has the advantage of using fewer components and possibly allowing for longer life cartridges and hence, a lower cost per page. Regardless of whether the toner is charged via MCD or DCD process, printing uses the same process of toner transfer to an imaging substrate that has been discharged via light, such as a photoconductor or photoreceptor drum or belt. Toner is then directly transferred to a media sheet or to an intermediate image transfer member before being transferred onto a media sheet.

Toner particles consist of resin, wax, pigments, and other components. Toner particles used in the printing process are typically treated with surface additives. The particles are covered with extra particulate additives (EPA) to provide the correct triboelectric and rheology characteristics. These EPAs are based on silicon dioxide also known as silica, titanium dioxide also known as titania, aluminum oxide also known as alumina, and/or composite mixtures of titania, silica, and/or alumina.

The effectiveness of toner particles depend on having an adequate coverage on each toner particle. If the toner particles contain too much or too little coverage of EPA particles on the surface, the print quality will be negatively impacted. Additionally, the printer will consume too much toner per printed page. The same would be true if some EPAs end up embedded into the surface of a toner particle. A small change of EPA coverage on the toner particles is significant for performance but cannot be easily quantified by simple visual inspection, even using such methods as scanning electron microscopy (SEM).

Previous methods to determine EPA coverage of the toner surface, such as X-ray fluorescence (XRF), Fourier transform infrared spectroscopy (FTIR), and inductively couple plasma (ICP) analyses involved bulk measurements and were incapable of discerning embedded and/or knocked off EPA particles. There is therefore a need for a method to quantitatively determine the EPA coverage of the toner surface that can provide reproducibility and precision that is beyond the capabilities of the human eye.

SUMMARY OF THE INVENTION

Brief Description of the Drawings

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION

Figure 1:
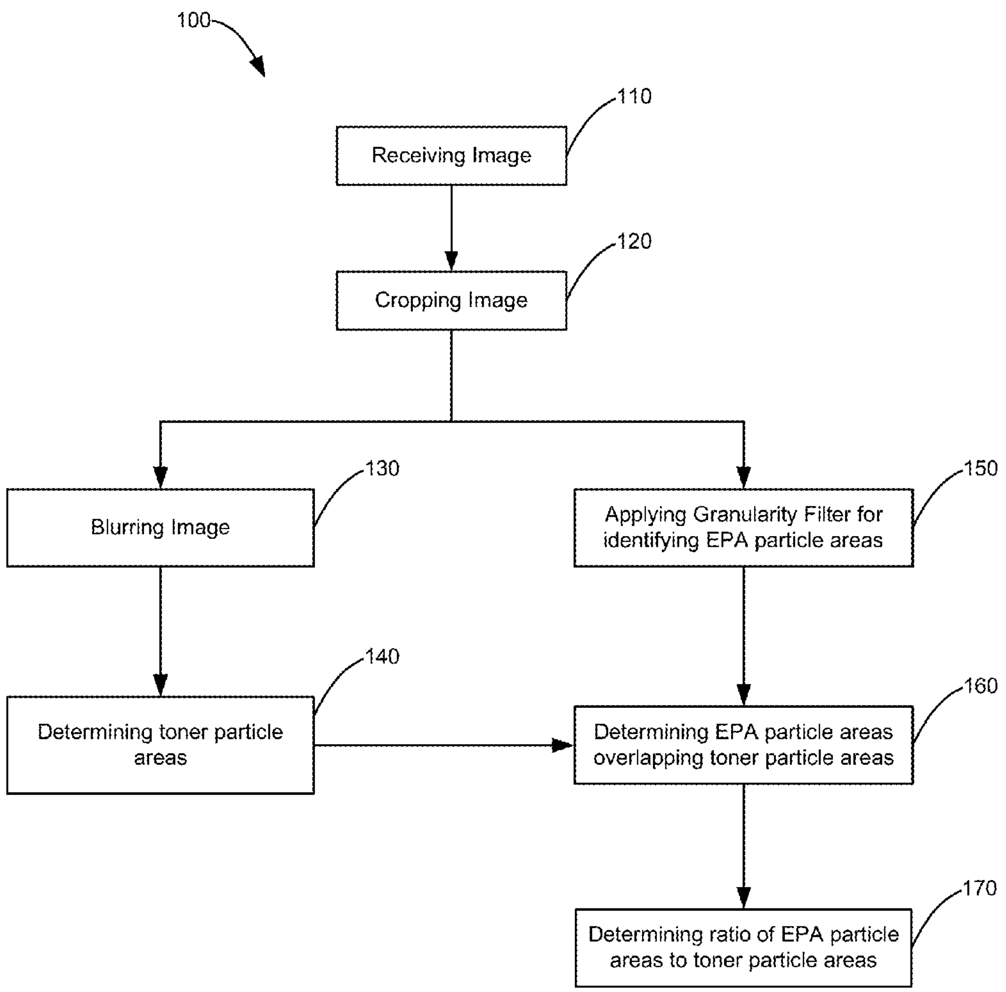
FIG. 1 is an example flowchart of one example method of using automated image analysis to determine the percentage coverage of extra particulate additives on surfaces of toner particles.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The present disclosure is directed at a method of quantifying the coverage of the surface of toner particles with EPA. The method uses automated image analysis to correctly identify toner and EPA particles, and to quantify the coverage of the toner particles with EPA particles.

Toner may consist of a base particle and surface-borne extra particulate additives (EPA). These extra particulates may serve a variety of functions to improve the tribocharge performance and rheology characteristics, may generally be submicron in size, and have a very high surface area. EPA particles may include particles such as silica, alumina, titania, or mixtures thereof. Particles of different types and sizes are often combined to give to toner one or more desired characteristics. Examples of silica, alumina and titania are shown below. The list is for illustrative purposes only and is not meant to be exhaustive.

| EPA | Primary Particle Size (nm) |
|---|---|
| Silica S1 | 8 |
| Silica S2 | 8 |
| Silica S3 | 40 |
| Silica S4 | 40 |
| Silica S5 | 50 |
| Silica S6 | 70 |
| Silica S7 | 70 |
| Silica S8 | 80 |
| Silica S9 | 80 |
| Silica S10 | 100 |
| Silica S11 | 12 |
| Alumina A1 | 12 |
| Titania | 40 |
| Titania | 60 |

The effectivity of EPA particles to give the toner desired characteristics is reliant on how much coverage the EPA particles have on the surface of the toner particles. Too little coverage may not afford the desired characteristics while too much could possibly inhibit the function of the toner particle itself during printing. Also, some EPA particles may fall off of the toner particles, or may become embedded into the surface of the toner particles. In either case, the EPA may not be able to perform its intended purpose. It is therefore of great importance for toner manufacturers to be able to find out how much of the EPA particles cover the toner particles both initially and at certain points as the toner particles go through a printing operation in an imaging device.

FIG. 1 shows an example embodiment of a method 100 to determine the percent coverage of extra particulate additives (EPA) on surfaces of toner particles using automated image analysis. In some example embodiments, method 100 may be executed using available image processing software, such as, for example, Image J. In other example embodiments, method 100 may be executed using image processing software specifically coded to perform method 100. In yet other example embodiments, method 100 may be performed by using a custom-scripted automation macro within an existing image processing program.

At block 110, an image is received. The image may be received directly from an image capturing equipment, such as a scanning electron microscope. Alternatively, the image may be from a remote storage location or from local memory. The image may be in a raw, TIFF, PNG, GIF, JPEG, BMP, DICOM, or FITS format. In some example embodiments, a copy of the image may be generated in a desired format prior to further processing. In other example embodiments, the image may be converted into the desired format prior to further processing.

Figure 2:
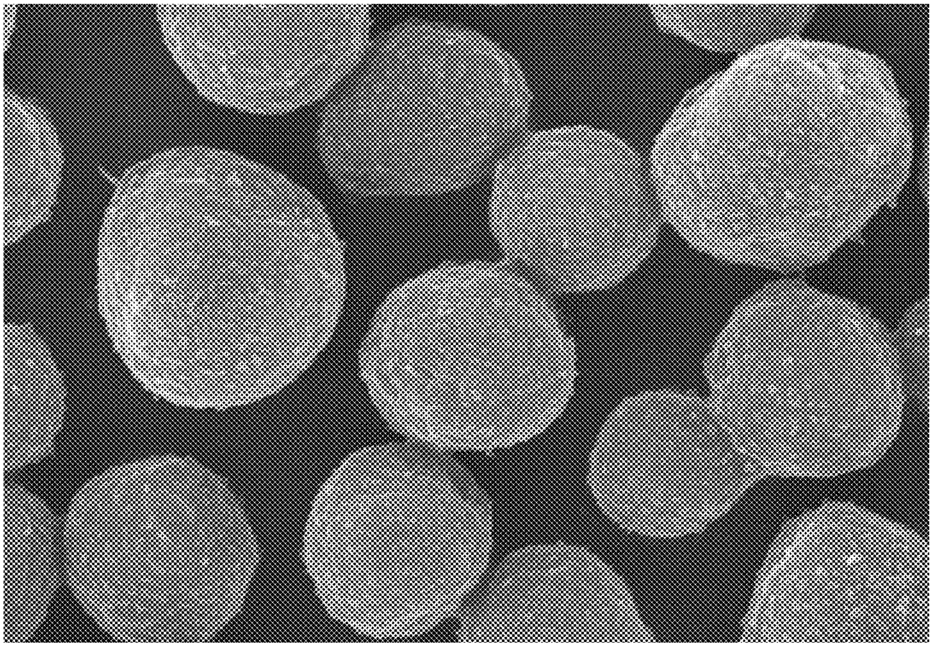
FIG. 2 is an example scanning electron micrograph (SEM) image of toner particles covered with EPA particles.

At block 120, the image is cropped to remove any borders and/or text. FIG. 2 shows a cropped SEM image of toner particles.

Referring back to FIG. 1, at block 130, the cropped image is blurred. An amount of blur is introduced into the image to facilitate the identification of toner particle areas from background areas. Introducing blur means that there would be some loss in the toner particle areas later on, particularly around the edges. To minimize this loss, and to ensure that blurring will not result in an overestimation of the toner particle areas, the amount of blur introduced has to be optimized. In some example embodiments, the amount of blur introduced may be determined and adjusted by a user of an image processing software performing method 100. In some alternative embodiments, the amount of blur may be determined by a learning algorithm configured to optimize the toner particle areas. Once an appropriate amount of blur has been applied, the toner particle areas may be determined at block 140.

Figure 3:
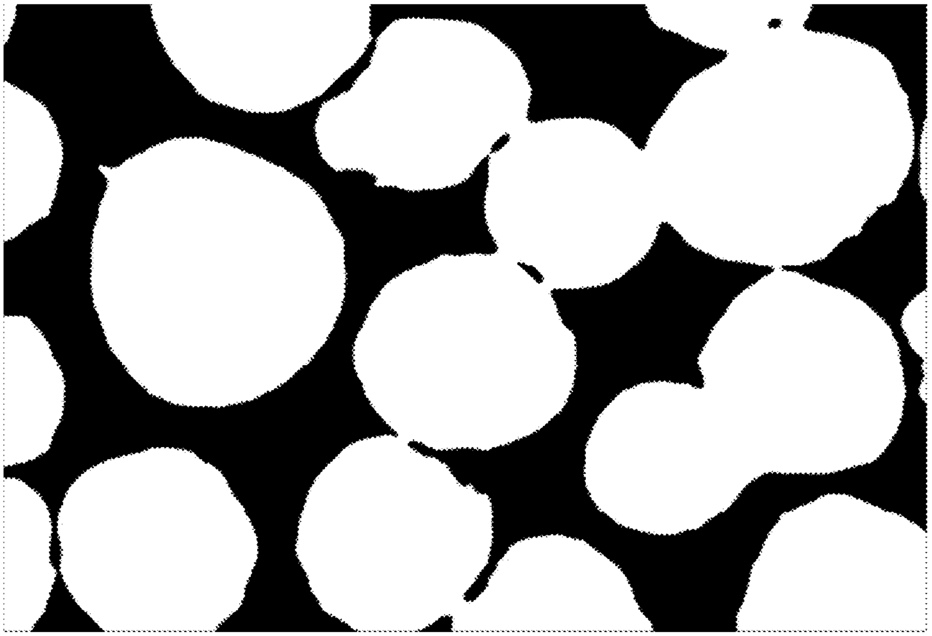
FIG. 3 is an example image processed according to the method of FIG. 1 showing identified toner particle areas.

FIG. 3 shows the SEM image of FIG. 2 after blurring, with the toner particle areas shown in white. Referring back to FIG. 1, at block 140, the toner particle areas are determined. An area is determined as a toner particle area if the area meets a first brightness threshold. In some example embodiments, the first brightness threshold may be set by a user of an image processing software performing method 100. In other example embodiments, the first brightness threshold is preconfigured into the image processing software performing method 100. In yet other example embodiments, the first brightness threshold is configured into a custom-scripted automation macro which allows image processing software to perform method 100. Determining the toner particle areas may also include quantifying the identified toner particle areas. In some example embodiments, the identified toner particle areas may be quantified in pixels. The identified toner particle areas as well as the quantity of the identified toner particle areas may then be used in determining overlap and determining the ratio of EPA areas to toner particle areas at block 160 and block 170, respectively.

Figure 4:
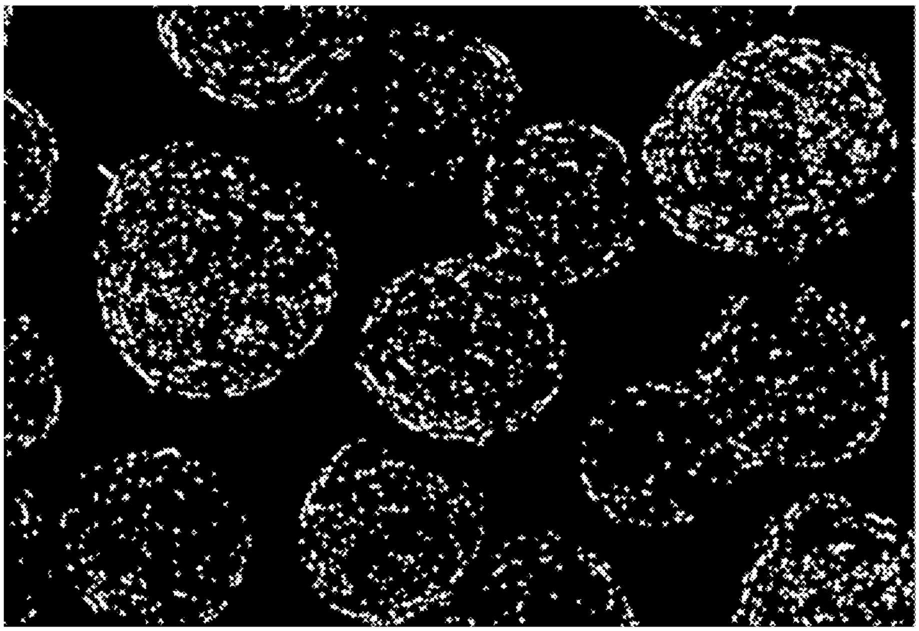
FIG. 4 is an example image processed according to the method of FIG. 1 showing identified large EPA particle areas.
Figure 5:
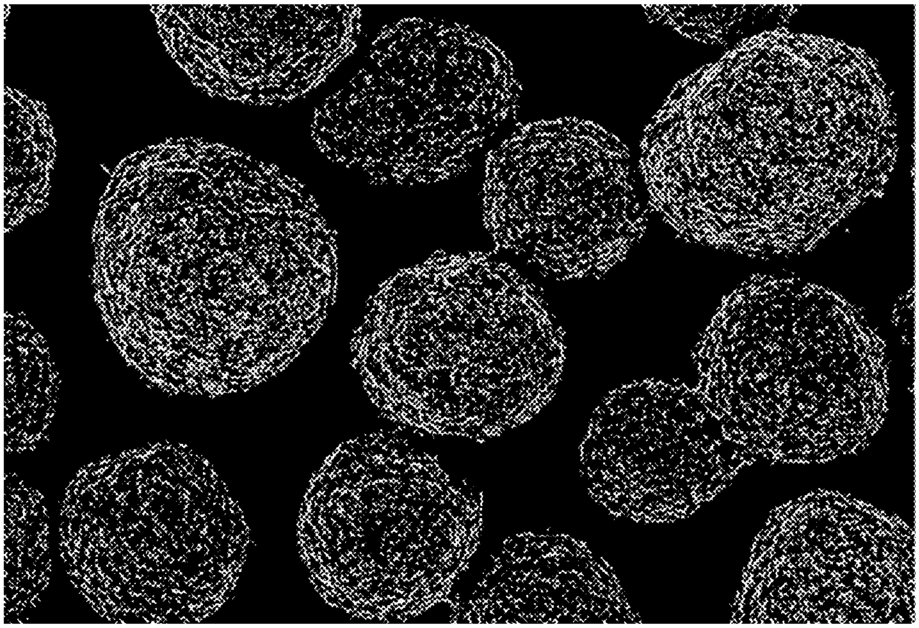
FIG. 5 is an example image processed according to the method of FIG. 1 showing identified small EPA particle areas.

At block 150, EPA particle areas are determined by identifying areas within a size threshold and a second brightness threshold. The areas within a size threshold and a second brightness threshold correspond to EPA particle areas, that is, areas covered by the EPA particles. To identify the EPA particle areas, a granularity filter is applied to the cropped image from block 120. A granularity filter is a common function in available image processing software typically used to control the granularity of a digital image, either increasing or reducing granularity to achieve a desired texture on an image, such as a digital photograph. In identifying the EPA particle areas, areas corresponding to a second brightness area are identified. A granularity filter with a size threshold is then applied. The size threshold corresponds to the size of the EPA particles on the image. For example, applying method 100 to an SEM image with 5000× magnification, large EPA particles may be identified by setting the granularity filter to have a size threshold of between about 1 to about 20 pixels, with the optimum between about 5 to about 10 pixels. For smaller EPA particles, a smaller size threshold may be used. The granularity filter may also be applied multiple times, with a number of different size thresholds in order to identify different types of EPA particles having different sizes. FIG. 4 and FIG. 5 show the SEM image of FIG. 2 after applying block 150, with identified EPA particle areas in white corresponding to large and small EPA particles, respectively. In some example embodiments, the second brightness threshold and the size threshold may be set by a user of an image processing software performing method 100. In other example embodiments, the second brightness threshold and the size threshold are preconfigured into the image processing software performing method 100. In yet other example embodiments, the second brightness threshold and the size threshold are configured into a custom-scripted automation macro which allows image processing software to perform method 100. The identified EPA particle areas may then be used in determining overlap at block 160.

At block 160, using the identified toner particle areas from block 140, EPA particle areas that overlap the toner particle areas are determined. This ensures that EPA particles that are not on the surface of toner particles will not be included in determining the ratio of EPA areas to toner particle areas at block 170. In some example embodiments, the EPA particle areas that overlap the toner particle areas are determined by convolving the two areas, such as for example, convolving FIG. 2 and FIG. 4. Only EPA particle areas that overlap with toner particle areas, corresponding to EPA particles on the surface of toner particles, are used in in determining the ratio of EPA particle areas to toner particle areas at block 170.

At block 170, the ratio of EPA areas to toner particle areas is determined. Determining the ratio of EPA areas to toner particle areas may also quantifying the identified EPA particle areas that overlap with toner areas from block 160. In some example embodiments, the identified EPA particle areas may be quantified in pixels. The quantity of identified EPA particle areas is then compared with the quantity of the identified toner particle areas from block 140. The result is the percent coverage of EPA particles on surfaces of toner particles.

To improve confidence in the measured EPA coverage, it is beneficial to analyze multiple SEM images. With analysis of images that cover 100 toner particles, the measurement confidence is ±1.5%. Increasing the number of images to cover 400 toner particles improved measurement confidence to ±0.8%.

The foregoing description of several methods and an embodiment of the invention have been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method of determining a percentage coverage of extra particulate additives on surfaces of toner particles, comprising:
- receiving an image of the toner particles;
- determining a first area of a toner particle surface not covered by extra particulate additives, corresponding to a first brightness threshold;
- determining at least one other area of a toner particle surface covered by extra particulate additives,
- corresponding to a second brightness threshold;
- determining a ratio of the first area to the at least one other area, the ratio corresponding to the relative amount of extra particulate additives on surfaces of toner particles; and
- adjusting coverage of extra particulate additives on surfaces of toner particles in a printing operation of an imaging device, based on the determined ratio;
- wherein at least one of the receiving, the determining the first area, the determining the second area, and the determining the ratio is performed automatically; and
- wherein determining the ratio further comprises
  - determining areas of overlap between the first area and the at least one other area; and
  - eliminating non-overlapping portions of the at least one other area,
  - such that only the overlapping portions of the at least one other area are included in the determining the ratio.

2. The method of claim 1, wherein the determining the at least one other area comprises determining at least one other area corresponding to the second brightness threshold, and at least one size threshold.

3. The method of claim 2, wherein the determining the ratio comprises determining a ratio of the first area to each of the at least one other area corresponding to each of the at least one size threshold.

4. The method of claim 2, wherein the at least one size threshold corresponds to a size of at least one type of extra particulate additive.

5. The method of claim 1, wherein the image is a scanning electron micrograph.

6. The method of claim 1, further comprising,
- cropping the image; and
- blurring the image to facilitate determining the first area.

7. A non-transitory computer-readable storage medium containing one or more computer executable instructions to determine a relative amount of extra particulate additives on surfaces of toner particles, comprising:
- receiving an image of the toner particles;
- determining a first area of a toner particle surface not covered by extra particulate additives, corresponding to a first brightness threshold;
- determining at least one other area of a toner particle surface covered by extra particulate additives,
- corresponding to a second brightness threshold;
- determining a ratio of the first area to the at least one other area, the ratio corresponding to the relative amount of extra particulate additives on surfaces of toner particles; and
- adjusting coverage of extra particulate additives on surfaces of toner particles in a printing operation of an imaging device, based on the determined ratio;
- wherein at least one of the receiving, the determining the first area, the determining the second area, and the determining the ratio is performed automatically; and
- wherein determining the ratio further comprises
  - determining areas of overlap between the first area and the at least one other area; and
  - eliminating non-overlapping portions of the at least one other area,
  - such that only the overlapping portions of the at least one other area are included in the determining the ratio.

8. The non-transitory computer-readable storage medium of claim 7, wherein the determining the at least one area comprises determining at least one other area corresponding to the second brightness threshold, and at least one size threshold.

9. The non-transitory computer-readable storage medium of claim 8, wherein the determining the ratio comprises determining a ratio of the first area to each of the at least one other area corresponding to each of the at least one size threshold.

10. The non-transitory computer-readable storage medium of claim 8, wherein the at least one size threshold corresponds to a size of at least one type of extra particulate additive.

11. The non-transitory computer-readable storage medium of claim 7, wherein the image is a scanning electron micrograph.

12. The non-transitory computer-readable storage medium of claim 7, wherein the determining the at least one other area is performed by applying a granularity filter.

13. The non-transitory computer-readable storage medium of claim 12, wherein the at least one size threshold is between about 1 and about 20 pixels.

14. The non-transitory computer-readable storage medium of claim 13, wherein the at least one size threshold is between about 5 and about 10 pixels.

15. The non-transitory computer-readable storage medium of claim 12, wherein the second brightness threshold is between about 5 and about 20.

16. The non-transitory computer-readable storage medium of claim 15, wherein the second brightness threshold is about 15.

17. The non-transitory computer-readable storage medium of claim 7, further comprising,
- cropping the image; and
- blurring the image to facilitate determining the first area.

* * * * *